(No Model.)

J. BLAIR & A. G. HUNTER.
PYROCHEMICAL BATTERY.

No. 446,727. Patented Feb. 17, 1891.

Witnesses
J. Edw. Maybee
W. G. McMillan

Inventors
John Blair
Alex. G. Hunter
by Donald C. Ridout & Co.
Attys

UNITED STATES PATENT OFFICE.

JOHN BLAIR, OF NORTH ORILLIA, AND ALEXANDER G. HUNTER, OF DUNDALK, ONTARIO, CANADA.

PYRO-CHEMICAL BATTERY.

SPECIFICATION forming part of Letters Patent No. 446,727, dated February 17, 1891.

Application filed June 25, 1890. Serial No. 356,684. (No model.)

*To all whom it may concern:*

Be it known that we, JOHN BLAIR, of the township of North Orillia, in the county of Simcoe, in the Province of Ontario, Canada, and ALEXANDER GOKEY HUNTER, of the town of Dundalk, in the county of Grey, in the Province of Ontario, Canada, have jointly invented certain new and useful Improvements in Pyro-Chemical Batteries, of which the following is a specification.

The object of the invention is to produce a battery or cell capable of generating in a cheap and effective manner a constant flow of electricity adapted for use in incandescent or arc lighting or all purposes to which electricity is applied; and it consists, essentially, of a cell containing a series of composite plates, each formed of an iron plate separated from two carbon plates by prepared absorbent septa or partitions, the whole being clamped together, the chemically-active plates being connected by a wire with the chemically-passive plates in the successive composite plates in the usual manner. The lower part of the cell, which is open, is fixed on a box or vessel charged with materials in which a chemical transfer of elements is caused by the application of heat, and the gas thus formed escapes and generates by means of the plates a current of electricity, substantially as hereinafter specified.

Figure 1:
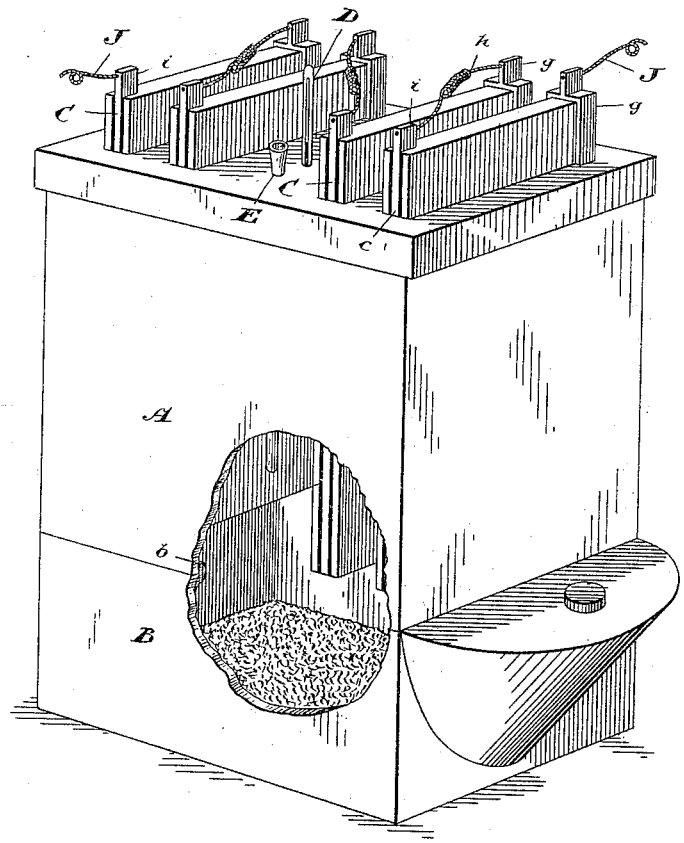
Figure 2:
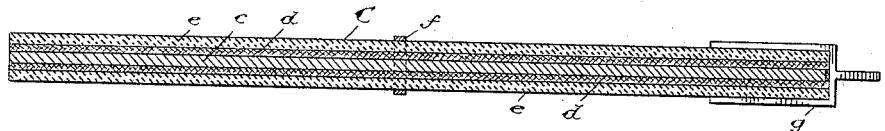

Figure 1 is a perspective view view of our improved cell and gas-charger, partially broken away. Fig. 2 is a sectional detail of one of the composite plates.

Like letters indicate similar parts in the different figures.

In Fig. 1, A is a box or cell of suitable size open at the bottom and fitted into a box or gas-charger B and resting on a ledge $b$ in said gas-charger. Within this cell A are placed at suitable intervals composite plates C, composed of an iron plate $c$, prepared absorbent septa or partitions $d$, and carbon plates $e$, bound together by clamps $f$, as shown more particularly in Fig. 2, or any other suitable manner.

$g$ are clips passing over the carbon plates $e$, to which are attached wires $h$, leading to the leg $i$, attached to the iron plate $c$ in the adjoining composite plate. These composite plates C may be placed in the cell at intervals of half an inch or more apart.

In charging the cell we resort to several formulæ for generating the gas required to render the cell active in the production of electricity, the cell becoming active with any charge in which a chemical transfer of elements is caused by the application of heat.

To charge the cell A we fill the gas-charger B preferably with (1) a mixture of eight ounces of chloride of sodium, (common salt,) three ounces of sulphuric acid, and four ounces of water; or (2) four ounces of chloride of sodium, one ounce of black oxide of manganese, two ounces of sulphuric acid, and two ounces of water; or (3) two parts of chloride of sodium, one fourth part of soda nitrate, and one-half part of sulphuric acid and one part of water. On heat being applied to the gas-charger hydrochloric-acid gas or chlorine gas, as the case may be, is given off and ascends or is forced up into the cell A, in which the composite plates B are placed, which take in, absorb, and store up the said ascending gas, which meets with moisture in said plates, causing them to give out eventually, when the terminals J are joined, a strong and steady current of electricity. The electric motive force, which is first at zero, (0,) gradually rises as the heating of the gas-charger B and the interior of the cell A increases, and when the cell has reached a temperature of 140° Fahrenheit it has also reached its maximum working-power.

D is a thermometer inserted in the cell A to indicate the internal heat, and E is a pipe to facilitate, if desired, the introduction of the several liquid elements used in the production of the gases. Heat may be applied to the gas-charger and cell from a furnace or otherwise.

Our cell is accumulative and acts in a double capacity, either as a "primary" or a "storage" cell. The gas or charge which is stored up in said cell can be reserved for an indefinite time and used at will without the aid of heat.

The cells may be made any desired size or shape, and may contain any number of plates as described, all of which may be coupled in series or parallel, according to the purposes for which they may be required. When in action, the cells are absolutely constant and in practice run at a temperature of from 100° to 160° Fahrenheit and give out a steady electric current.

What we claim as our invention is—

1. In a pyro-chemical battery, a cell communicating with a gas-charger charged with materials in which a chemical transfer of elements is caused by the application of heat and a gas evolved capable of acting on an iron plate, and one or more composite plates fixed in said cell, each formed of an iron plate separated from two carbon plates by prepared septa or partitions and clamped together, the ascending gas generating by means of said composite plate or plates and connecting-wires a current of electricity, substantially as described and specified.

2. In the cell A of a pyro-chemical battery, the combination of an iron plate $c$, partitions $d$, and carbon plates $e$, clamped together to form the composite plate C and operated to produce a current of electricity, substantially as described and specified.

3. In a pyro-chemical battery, a gas-charger B, adapted to contain a mixture in the proportion of eight ounces of chloride of sodium, three ounces of sulphuric acid, and four ounces of water chemically combined by the application of heat so as to evolve hydrochloric-acid gas or any equivalent mixture capable of producing chlorine or a gas which acts on iron, in combination with a cell A, communicating with said gas-charger B and containing a composite plate C or a series thereof arranged and operated to produce a flow of electricity, substantially as described and specified.

4. In a cell A of pyro-chemical battery, the composite plate C or a series thereof adapted to store the gas or charge evolved from the gas-charger B, and to produce, when desired, a flow of electricity without the aid of heat, substantially as described and specified.

JOHN BLAIR.

In presence of—
  HUGH JOHNSTON,
  HENRY F. HUNTER.

ALEXANDER G. HUNTER.

In presence of—
  SAML. S. ROBINSON,
  R. R. SLAVEN.